United States Patent [19]
Cantenot

[11] 3,817,407
[45] June 18, 1974

[54] SILO FOR GRANULAR OR PULVERULENT MATERIALS
[76] Inventor: Paul Cantenot, Parcey Jura, France
[22] Filed: Oct. 13, 1972
[21] Appl. No.: 297,337

[52] U.S. Cl............................................ 214/17 DA
[51] Int. Cl.............................................. B65g 65/46
[58] Field of Search...................... 214/17 D, 17 DA

[56] References Cited
UNITED STATES PATENTS
| | | | |
|---|---|---|---|
| 3,050,201 | 8/1962 | Humphrey | 214/17 DA |
| 3,240,366 | 3/1966 | Sahr | 214/17 D |
| 3,606,037 | 9/1971 | Peterson et al. | 214/17 DA X |

Primary Examiner—Robert G. Sheridan
Attorney, Agent, or Firm—Karl F. Ross; Herbert Dubno

[57] ABSTRACT

This silo having a circular cross-section and a vertical axis comprises near its bottom a diametral beam of inverted V configuration for sheltering the mechanism within the silo driving the discharge member against the action of the stored material. This mechanism may be disposed above or beneath the floor and the beam is so dimensioned and positioned that the natural angle of repose of the stored material cannot impinge directly, by gravity, upon the mechanism.

3 Claims, 7 Drawing Figures

PATENTED JUN 18 1974   3,817,407
FIG 3
FIG.5
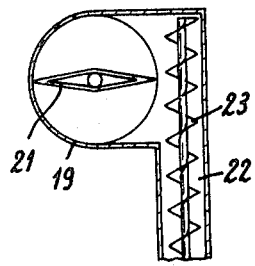
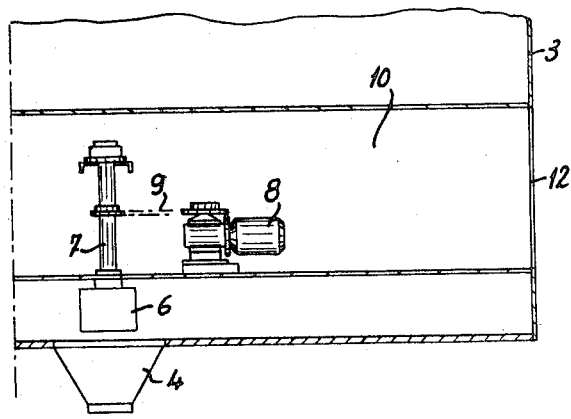
FIG.6
FIG.7
FIG 4
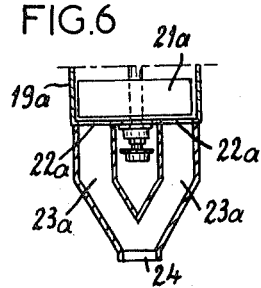
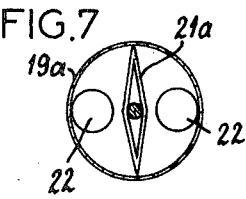
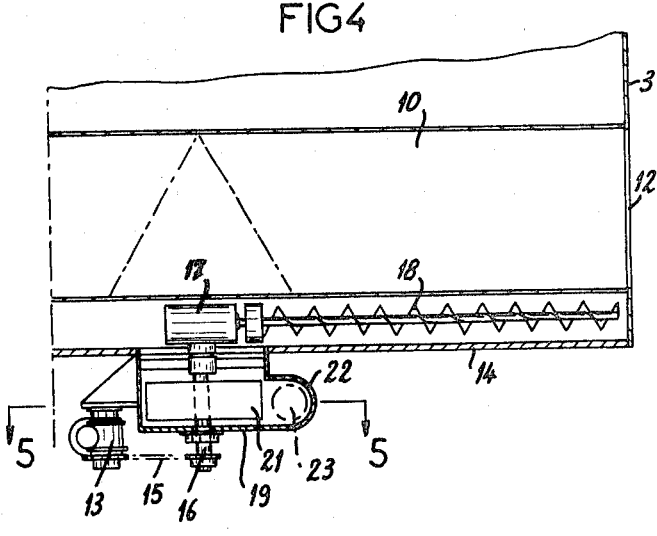

SILO FOR GRANULAR OR PULVERULENT MATERIALS

BACKGROUND OF THE INVENTION

1. Field of the Invention

This invention relates to silos in general and has specific reference to improvements in silos for the storage of pulverulent or granular materials and, more particularly, to means for discharging these materials from the silo.

2. Description of the Prior Art

Various types of mechanisms have already been proposed for discharging granular or pulverulent materials stored in silos; thus, inter alia, devices have been proposed which comprise essentially a spiral conveyor or endless screw which, by rotating about its axis and travelling at the same time in translation on the bottom of the silo, carries along the meal or other material stored in the silo towards a spout or chute for discharging this meal or material. Among various advantages, this arrangement permits relatively large dimensions, especially in the vertical direction, for the silo, since the complete discharge unit can be disposed in the lower portion thereof. However, these structures are objectionable on account of two major inconveniences. One is due to the vault, arch or "bridge" usually formed by the material in the silo above the outlet orifice, the sudden collapse of which causes this orifice to be clogged, especially when restarting the discharge mechanism.

Another known inconvenience lies in the necessity of draining the silo completely by using emergency means to permit the access to the discharge means in case of failure.

SUMMARY OF THE INVENTION

It is the chief object of the present invention to avoid these various inconveniences and, to this end, the invention provides a silo of which the lower portion receives a hollow beam opening into two lateral apertures of the silo and enclosing or shielding in its central section the mechanism driving the member for discharging the material contained in the silo, said beam being so positioned and dimensioned as to meet a two fold requirement: preventing the natural angle of repose of the stored material from blocking the outlet orifice and permitting the access to the endless screw or chain driving mechanism for disassembling repair or maintenance purposes.

Various beam shapes may be comtemplated. Thus, according to a specific form of embodiment of the present invention, said beam may have an inverted V cross-sectional configuration.

As to the discharge or draining mechanism proper, it may be of any of various different and known types. Thus, it may consist of a spiral conveyor or endless screw rotating about its axis; of an endless chain travelling on a carrier arm; this screw or arm being caused at the same time to rotate about a vertical shaft which, being disposed at the centre of the lower portion of the silo, is rotatably driven from a motor and reduction gearing.

BRIEF DESCRIPTION OF THE DRAWING

FIG. 3 is a fragmentary vertical section taken along the line 3—3 of FIG. 1 or of FIG. 2;

FIG. 4 is a vertical section corresponding to FIG. 3, but showing a modified embodiment of the system provided for discharging the material contained in the silo;

FIG. 5 is a section taken along the line 5—5 of FIG 4; and

FIGS. 6 and 7 are fragmentary views, namely a vertical sectional view and a plan view, respectively, of a modification of the arrangement illustrated in FIGS. 4 and 5.

SPECIFIC DESCRIPTION

Figure 1:
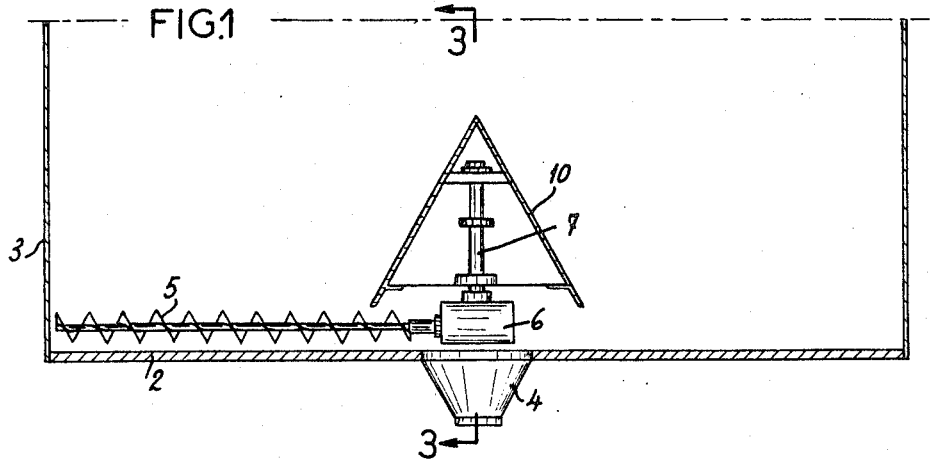
FIGS. 1 and 2 are a vertical sectional view and a plan view from above, respectively, of the lower portion of a silo according to this invention, the section of FIG. 1 being taken along the line 1—1 of FIG. 2.
Figure 2:
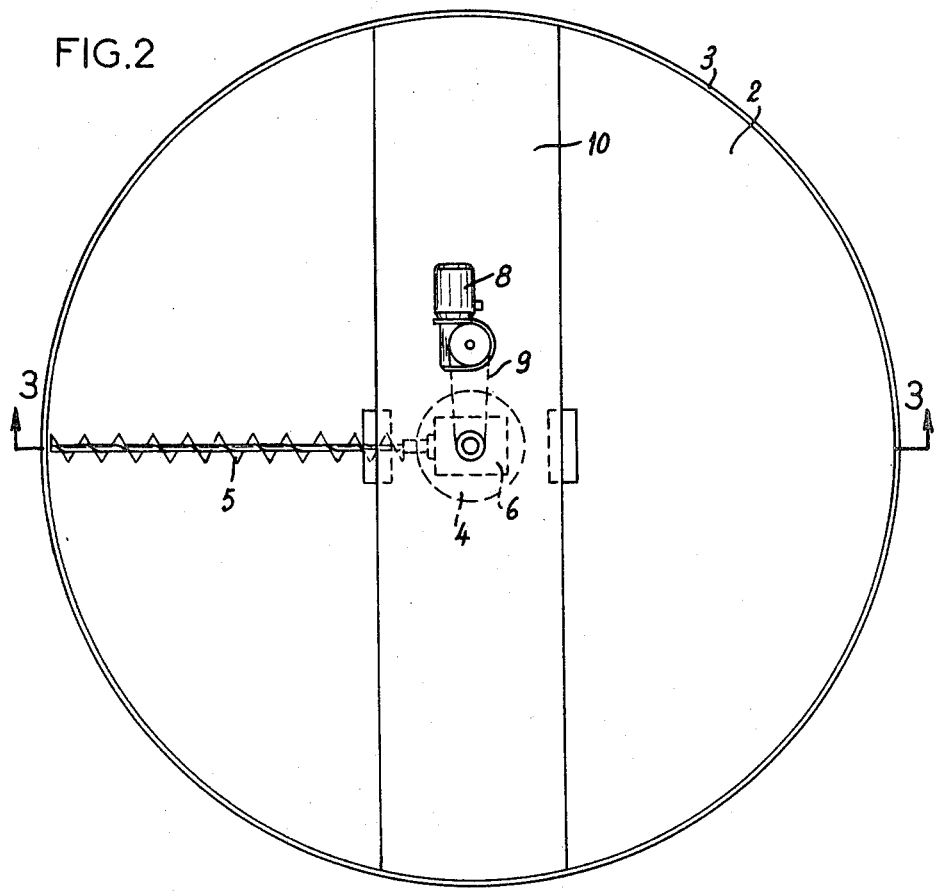

The silo illustrated in FIGS. 1-3 of the drawings is of the known type wherein the meal or other pulverulent or granular material contained in the silo is discharged through the combined action of an endless screw and gravity. The reference numeral 2 designates the bottom or floor of the silo and 3 is its lateral cylindrical vertical wall. Formed centrally of the floor or bottom 2 is an aperture provided with a spout, duct or funnel 4 adapted to discharge the pulverulent or like material, for instance meal. The mechanism for drawing the meal and directing same towards the spout 4 consists, as already known per se, of an endless screw or spiral conveyor 5 rotatably driven and moved in its plane by a bevel gear transmission 6 supported and rotatably driven from a vertical shaft 7 driven in turn from a motor and reduction-gear unit 8 through a transmission chain 9.

According to this invention, this motor and reduction gearing 8, the transmission chain 9 and the vertical shaft 7 are housed in the central section of a beam 10 disposed in the lower portion of the silo 3. This beam 10 has the shape of an inverted V in cross-section and opens at either end into a pair of lateral apertures 12 formed in diametrally opposed areas of the lateral wall 3 of the silo. These apertures 12 may of course be closed by suitable doors or plates (not shown).

The function of this beam 10 is twofold. Firstly, it constitutes an efficient shelter for the complete mechanism driving the screw 5, i.e., the motor and reduction gearing unit 8, chain 9, shaft 7 and bevel gear 6, for protecting these elements from the detrimental action of the meal or other material or product stored in the silo 3. Secondly, it permits a direct access to this mechanism for example for maintenance or repair purposes, without having to discharge beforehand the product contained in the silo. In fact, it is only necessary to open the lateral door or doors closing the beam 10 at either end to have direct access to the discharge mechanism and thus easily perform all necessary maintenance or repair work thereon, or possibly the dismantling thereof. This particular beam arrangement in the lower portion of the silo can be used irrespective of the particular means provided in the silo for discharging same. Thus, instead of a screw discharge device comprising an endless screw or spiral conveyor 5, a device comprising an endless chain carried by a radial rotating arm carried by the bevel gearbox 6 may be provided. Therefore, the specific application of this invention to the case of a screw mechanism should not be construed as limiting the scope of the invention since it is given by way of illustration only.

In FIGS. 1 – 3, the motor and reduction gearing unit is housed within the beam 10, therefore above the floor of the silo. However, it is obvious that under certain circumstances it may be advantageous to locate the motor and reduction mechanism beneath this floor, and FIGS. 4– 7 actually illustrate this particular case.

In FIGS. 4 and 5, the motor and reduction unit is disposed beneath the silo bottom and the material contained in the silo is discharged laterally. The reference numeral 13 designates the motor and reduction-gear unit carried by a frame structure disposed beneath the floor 14 of the silo. This unit drives through an endless transmission chain 15 the vertical shaft 16 carrying and driving the bevel gearbox 17 imparting to the endless screw or spiral conveyor 18 its movements of rotation and translation in the lower portion of the silo. This screw 18 causes the material stored in the silo to be conveyed or transferred into a casing 19 underlying the central aperture of the silo bottom; rotatably mounted in this casing 19 and rigid with said vertical shaft 16 is a twin blade rotor 21 adapted to direct the meal or other material falling into the casing 19 out laterally and into a duct 22 in which an endless screw or spiral conveyor 23 is rotatably mounted and driven for laterally discharging this meal or other material.

However, it may be noted that the discharge of material, instead of being directed laterally as in the case illustrated in FIGS. 4 and 5, may take place by gravity, as shown for the System of FIGS 6 and 7. In this arrangement, in fact, the casing 19a in which the twin-blade rotor 21a is rotagably mounted, comprises in its bottom two orifices 22a opening into a pair of corresponding ducts 23a merging into each other to form a discharge spout 24 at their lower ends.

In any case, the mechanism utilized for withdrawing meal or other material contained in the silo and discharging same to the outside is located either within or beneath the beam 10, the latter extending throughout the diameter of the lower portion of the silo so that this mechanism is constantly sheltered from the contents of the silo and can be maintained, checked, repaired or dismantled without having to drain the silo beforehand.

Of course, various modifications and variations may be made to the embodiments of the invention shown and described herein, without departing from the basic principle of the invention, as will readily occur to those conversant with the art.

What I claim as new is:

1. A silo for the storage and dispensing of flowable solid material, comprising:
    a vessel having a bottom and a vertically extending cylindrical wall surrounding a vertical axis;
    an elongated hollow beam of inverted-V cross-section extending diametrically within said vessel close to but spaced above said bottom between diametrically spaced portions of said lateral wall and reaching thereto;
    a central opening formed in said body below said beam for discharging said material upon the displacement thereof to said opening, said beam being dimensioned and shaped to prevent said material from self-flow through said opening;
    a radially extending discharge device displaceable to advance said material inwardly toward said opening;
    drive means above said bottom beneath said beam and sheltered thereby from said material for displacing said device to advance said material toward said opening and for rotating said device about said axis to sweep said device along said bottom; and
    lateral apertures formed in said portions of said wall and opening into said beam for affording access to said device and said driving means within a space sheltered from said material by said beam.

2. The silo defined in claim 1, wherein said drive means includes a bevel gearing, having a shaft extending along said axis and connected to said bevel gearing, said device comprising a screw rotatable by said bevel gearing and extending radially along said bottom of said vessel, said silo further comprising a motor and reduction gearing disposed above said bottom and below said beam within said vessel and operatively connected to said bevel gearing.

3. The silo defined in claim 1 further comprising means forming a compartment aligned with said opening and disposed below said bottom for receiving said material, said compartment having a lateral outlet;
    a shaft extending along said axis and through said compartment;
    a motor and reduction gear assembly disposed below said bottom and operatively connected to said shaft for driving same; and
    a twin blade rotor on said shaft in said compartment for displacing said material to said outlet, said drive means including bevel gearing operatively connected to said shaft.

* * * * *

UNITED STATES PATENT OFFICE
CERTIFICATE OF CORRECTION

Patent No. 3,817,407   Dated 18 June 1974

Inventor(s) Paul CANTENOT

It is certified that error appears in the above-identified patent and that said Letters Patent are hereby corrected as shown below:

In the heading, after line ⌈21⌋ insert:

-- Foreign Application Priority Data

19 October 1971   FRANCE   71 38 336 -- .

Signed and sealed this 10th day of December 1974.

(SEAL)
Attest:

McCOY M. GIBSON JR.
Attesting Officer

C. MARSHALL DANN
Commissioner of Patents

HD/lw